United States Patent Office 3,396,146
Patented Aug. 6, 1968

3,396,146
REACTIVE POLYPHENYLENE OXIDE COMPOSITION
Seymour Schmukler, Dalton, Mass., assignor to General Electric Company, a corporation of New York
No Drawing. Filed Oct. 21, 1966, Ser. No. 588,289
10 Claims. (Cl. 260—47)

ABSTRACT OF THE DISCLOSURE

A heat curable polyphenylene oxide composition comprising a polyphenylene oxide, a Lewis acid, and a material capable of generating at least two carbonium ions in the presence of the Lewis acid.

---

This invention relates to a heat curable polyphenylene oxide composition useful for coating comprising a solution of a major portion of a polyphenylene oxide and a minor portion of an organic material capable of generating at least two carbonium ions in the presence of a Lewis acid.

The polyphenylene oxides are disclosed and claimed in U.S. Patents Nos. 3,306,874 and 3,306,875. They are characterized by a combination of high tensile strength and modulus, high softening temperature, and excellent resistance against water, steam, strong acids and alkalies. However, their resistance to most common organic solvents is low. Aromatic and chlorinated hydrocarbon solvents dissolve phenylene oxide polymers while other solvents and solvent vapors induce crazing in molded polyphenylene oxide parts under stress, causing loss of strength. The tensile properties of the resins drop off sharply at about 300° C. Further, under extreme prolonged stress, molded parts formed from the polyphenylene oxides tend to creep, causing permanent deformation.

It is known that these disadvantages which are common to most thermoplastic materials, may be overcome by cross-linking the individual polymer molecules during or after, the forming of the material into its final shape. If a sufficient number of cross-linking sites are present, the material can be crosslinked and will then no longer be soluble, but only swell to a greater or lesser extent. Also, while the phenomenon of solvent crazing is not fully understood, it appears to involve crystallization of the polymer molecules. As the mobility of the polymer molecules is limited by crosslinking, crystallization is no longer possible, and thus the problem of solvent crazing is removed. The limitation on molecular mobility also prevents the polymer from flowing, even above its melting point, thus preventing, to a large degree, creep and loss of tensile properties at increased temperatures.

The polyphenylene oxides are, to a high degree, chemically inert, a desirable characteristic from a material standpoint. However, because of this inertness, the prior art has experienced difficulty in introducing crosslinks between polymer chains, and structurally different units generally, by simple chemical processes. For example, prolonged heating in the air will render the polymer insoluble in aromatic or chlorinated hydrocarbon solvents, but the degree of crosslinking accomplished is quite low and the materials produced swell to a considerable degree.

In accordance with the present invention, a polyphenylene oxide is cured by an electrophilic aromatic substitution reaction without first introducing a reactive crosslinking site on the polymer chain. In addition, the cured polymer formed according to the present invention has a crosslink believed to be attached directly to the aryl nucleus of two repeating units in adjacent polymer chains.

The polyphenylene oxides capable of crosslinking in accordance with this invention are those corresponding to the following formula

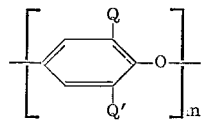

where Q and Q' represent monovalent substituents selected from the group consisting of hydrogen, halogen, hydrocarbon radicals, halohydrocarbon radicals having at least two carbon atoms between the halogen atoms and phenol nucleus, hydrocarbonoxy radicals having at least two carbon atoms and halohydrocarbonoxy radicals having at least two carbon atoms between the halogen atom and phenol nucleus. Crosslinking is accomplished by an electrophilic aromatic substitution reaction wherein substitution takes place in either the 3 or 5 positions of two phenylene nuclei in adjacent polymer chains. The reaction takes place by contacting the polymer with a crosslinking agent capable of generating at least two carbonium ions in the presence of a Lewis acid. As is well known in the art, a carbonium ion is a positively charged organic ion having one less electron than the corresponding free radical and acting in subsequent chemical reactions as though the positive charge was localized on the carbon atom. A Lewis acid is one that will accept a share in the electrons of another molecule.

The action of a carbonium ion on an aryl nucleus is well known in the art. The attack of the carbonium ion is facilitated by the easily available $\pi$ electrons of the aromatic system, and by its ready polarizability. The latter plays an important part in substitution reactions. The approach of the carbonium ion to an aromatic ring of the polymer polarizes the ring whether it is on the polymer backbone or substituted in either the 2 or 6 positions, and augments the development of a partial negative charge on the carbon atom attached, promoting the process of substitution. The overall process of crosslinking by substitution reactions involves the attack of the carbonium ions on the aromatic carbons in adjacent polymer chains, and the formation of a crosslinked substitution product after expulsion of a proton from each carbon attacked. Details for electrophilic aromatic substitution reactions can be found in "Structure and Mechanism in Organic Chemistry," C. K. Ingold, Cornell University Press, Ithaca, N.Y., 1953, pp. 206 to 212 and Chapter VI, the contents of which are incorporated herein by reference.

Almost any compound capable of generating at least two carbonium ions in the presence of a Lewis acid catalyst may be used as the crosslinking agent. However, it should be understood that some crosslinking agents are more reactive than others and reaction conditions must be adjusted to compensate for the difference in reactivity. For example, dialkyl halides are less reactive than dibenzyl halides and less severe reaction conditions are necessary for the latter—i.e., lower cure temperatures and shorter cure times. To use the curable polyphenylene oxide as a varnish or lacquer, it is desirable that the crosslinking agent be soluble in the same solvent as the polyphenylene oxide and be stable at the elevated temperatures necessary to effect curing. The crosslinking agent may be a polyfunctional aliphatic, including cycloaliphatic, aromatic or heterocyclic compound and may be a polymer if desired. A preferred class of crosslinking agents are those corresponding to the following formula:

III 

wherein B is a radical selected from the group consisting of aromatic, pseudo-aromatic heterocyclic and ureido; R is a lower alkyl having from 1 to 5 carbon atoms, and X is an ionizable group attached to an α carbon atom. By the expression "pseudo-aromatic heterocyclic," it is meant that the compound exhibits aromatic resonance. Typical examples of B include phenyl, naphthyl, diphenyl, diphenyl oxide, diphenyl sulphone, terphenyl, thienyl, pyrimidinyl, pyridinyl, etc. Typical examples of X include hydroxy, halo, acyl, alkoxy, etc. The compounds represented by the above formula are preferred because they have been found to be the most reactive in crosslinking of the polyphenylene oxides. In addition, they are stable at the elevated temperatures required for curing and they are soluble in a wide variety of solvents.

In general, the crosslinking agents may be selected from the groups including polyfunctional halides, alcohols, ethers, esters, etc.

Typical examples of polyfunctional halides, include, for example, 1,3-dichloromethylbenzene
1,2-dichloropropylbenzene
1,3-dibromomethylbenzene
1-chloromethyl-3-(α-bromoethyl)benzene
1,2,4-trichloromethylbenzene
1,4-dichloromethyl-3-ethylbenzene
2,2'-dichloromethyldiphenyl oxide
2,4'-dichloromethyldiphenyl oxide
2,2',4-(α,α',α''-trichloroethyl)diphenyl sulfone
2,2',4-trichloromethyldiphenyl sulfone
2,2'-dibromomethyldiphenyl sulfone
2,4'-dichloromethyldiphenyl
2,6-dichloromethyl naphthalene
terephthaloyl chloride
isophthaloyl chloride
adipoyl chloride, etc.

Typical examples of polyfunctional alcohols include, for example, 1,3-dihydroxymethylbenzene
1,2-dihydroxymethylbenzene
1-hydroxymethyl-3-(α-hydroxyethyl)benzene
4,4'-dihydroxymethyldiphenyl oxide
2,4'-dihydroxymethyldiphenyl oxide
N,N'-dihydroxymethyl urea
N,N',N''-trihydroxymethylmelamine
hexahydroxymethylmelamine
N,N'-dihydroxymethylethylene urea
3,3',5,5'-tetrahydroxymethyl-4,4'-dihydroxydiphenyl sulfone, etc.

Typical examples of polyfunctional ethers include, for example, 1,3-dimethoxymethylbenzene
1,2-dimethoxymethylbenzene
1-propoxy-3-(α-hydroxyethyl)benzene
4,4'-dimethoxymethyldiphenyl oxide
2,4' diethoxymethyldiphenyl oxide
methoxyethylcarbamate
2,6-dimethoxymethyl naphthalene
hexamethoxymethylmelamine
diacetoxymethyldiphenyl oxide
N'N'-dibutoxymethylethylene urea
N,N'-propoxymethyl urea
methylol phenyl ethers as described in U.S. Patents Nos. 2,579,220 and 2,579,221, etc.

Typical examples of esters include, for example, 1,4-diacetoxymethylbenzene
1,4-diacetoxymethyldiphenyl sulfone
diacetoxyhexahydroxymethyl melamine
3,3,5'-triacetoxymethyl-4,4'-dihydroxydiphenyl sulfone,
4,4'-diacetoxymethyldiphenyl sulphide
4,4'-diacetoxymethyldiphenyl oxide
2,6-diacetoxymethylnaphthalene
2,5-diacetoxymethylthiophene
2,4'-diacetoxymethyldiphenylmethane
methylol phenyl esters as described in U.S. Patent No. 2,579,329, etc.

The Lewis acid catalyst is preferably one that is soluble in a solution of the polyphenylene oxide and crosslinking agent though heterogeneous acids may be used if desired. The preferred catalyst is p-toluenesulfonic acid. However, any of the common acids known to those skilled in the art are suitable. Examples of suitable acids include, for example, stannic chloride, xylene sulfonic acid, benzene sulfonic acid, B-naphthalene sulfonic acid, ferric chloride, silver hexaflurophosphate, silver hexaflurosilicate, silver tetrafluroborate, p-chlorobenzenediazonium-hexaflurophosphate, etc.

In general, the preferred method for crosslinking a polyphenylene oxide in accordance with the present invention involves solution techniques. A solution is prepared containing a poly-(2,6-disubstituted-1,4-phenylene)-oxide, a Lewis acid and a crosslinking agent. Any solvent for the three components such as chlorobenzene, tetrahydrofuran, etc. is suitable provided it is not reactive with the components. The solution is then heated to evaporate the solvent and effect curing. Curing temperatures generally may range between 50° C. and 250° C. and preferably the higher temperatures are used.

The degree of crosslinking is dependent upon the properties of the polymer desired. As the degree of crosslinking increases, the polymer becomes more and more resistant to dissolving in various organic liquids. However, the increase in the degree of crosslinking is accompanied by increased structural rigidity of the polymer and increased embrittlement. In general, the degree of crosslinking is regulated by controlling the concentration of the crosslinking agent which may vary between 3 to 60% by weight of the polymer, and preferably between 5 and 40% by weight. The acid catalyst varies between 1 and 25% by weight of the polymer.

The following examples are set forth for purposes of illustration and should not be construed as limiting the invention in any way. All percentages expressed in the examples are by weight unless otherwise indicated.

Examples 1–9

A solution was prepared by dissolving 30 grams of a poly-(2,6-dimethyl-1,4-phenylene)-oxide having an intrinsic viscosity of 0.64 deciliter per gram (dl./g.) as measured in chloroform at 30° C. in 270 grams of chlorobenzene. This solution was identified as Solution A. A second solution, identified as Solution B, was prepared by dissolving 1.89 grams of p-toluenesulfonic acid monohydrate in 28.11 grams of tetrahydrofuran. Thereafter, mixtures were prepared containing 1 gram of Solution A, 83.5 milligrams of Solution B and a crosslinking agent in the amount indicated in Table I below. The crosslinking agent was a paraformaldehyde-m-xylene condensate formed in the manner set forth in Example 1 of U.S. Patent 2,825,712 patented Mar. 4, 1958. The so-formed mixtures were poured into aluminum pans and heated on a hot plate to effect curing. The cure schedule is set forth in Table I below. In all cases, the solvent was completely evaporated leaving a film of polymer on the aluminum pan.

Upon completion of curing, an indication of the degree of crosslinking was determined by measuring the linear swelling ratio, α. This ratio is determined by placing a sample of film under a microscope, placing a drop of a swelling solvent on the surface of the film (chlorobenzene in this example) and measuring the increase in length of the film at equilibrium. The length of the film as swollen divided by the original length of the film is the linear swelling ratio α. The following results were obtained:

TABLE I

| Example No. | Amount of crosslinking agent (mg.) | Cure Schedule | | α |
|---|---|---|---|---|
| | | Min. at 260° F. | Min. at 480° F. | |
| 1 | 0 | 31 | 15 | (¹) |
| 2 | 0 | 31 | 30 | (¹) |
| 3 | 0 | 31 | 45 | 2.26 |
| 4 | 0 | 31 | 75 | 1.74 |
| 5 | 20 | 31 | 15 | 1.39 |
| 6 | 20 | 31 | 30 | 1.39 |
| 7 | 20 | 31 | 45 | 1.31 |
| 8 | 40 | 31 | 15 | 1.36 |
| 9 | 40 | 31 | 30 | 1.38 |

¹ Dissolves.

From the above table, it is evident that heating of the polymer in the absence of a crosslinking agent does cause the polymer to crosslink to a limited degree. However, addition of the crosslinking agent to the polymer causes a substantial decrease in the linear swelling ratio, α, even with shorter curing times, thus indicating a greater degree of crosslinking.

Examples 10–13

The procedure of Examples 1–9 was repeated, but the crosslinking agent used was a diacetoxymethyl diphenyl-oxide believed to the have the following formula:

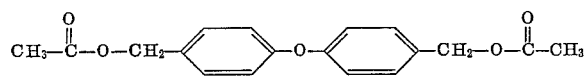

The Lewis acid used was p-toluenesulfonic acid. The quantities of materials used and the cure schedules are set forth in Table II below. Again, the linear swelling ratio, α, was used as an indication of crosslinking.

TABLE II

| Ex. No. | Amount of Lewis acid (mg.) | Amount of crosslinking agent (mg.) | Cure Schedule | | α |
|---|---|---|---|---|---|
| | | | Min. at 260° F. | Min. at 480° F. | |
| 10 | 0 | 34.5 | 31 | 30 | (¹) |
| 11 | 0 | 34.5 | 31 | 60 | (¹) |
| 12 | 4.96 | 34.5 | 31 | 30 | 1.17 |
| 13 | 4.96 | 34.5 | 31 | 60 | 1.20 |

¹ Dissolves.

This example illustrates the necessity for generating the carbonium ion to effect crosslinking. In Examples 10 and 11, the reaction mixture did not contain an acid, and therefore, the carbonium ions were not generated and substantial crosslinking did not occur.

Example 14

In this example, two samples were prepared. The first sample was prepared by mixing one gram of Solution A of Example 1 with a solution of 10.67 mg. of hydroxymethyl diphenyloxide dissolved in tetrahydrofuran. A second sample was prepared in the same way, but 4.96 mg. of p-toluenesulfonic acid in the form of Solution B of Example 1 was used. Both mixtures were poured into an aluminum pan, heated at 260° F. for 25 minutes and then at 480° F. for 30 minutes. The first sample, i.e., the one free of p-toluenesulfonic acid dissolved in chlorobenzene. The second sample had a linear stretch ratio, α, of 1.39.

Example 15

One gram of Solution A from Example 1 was mixed with 10.6 mg. of Solution B and 28.6 mg. of the reaction product of a mixture of methylol phenyl ethers and caprylic acid sold under the trademark Methylon. The mixture was spread on an aluminum pan and heated 37 minutes at 260° F. and 60 minutes at 480° F. The linear stretch ratio, α, of the resulting film was found to be 1.39.

Examples 16 to 21

Solution A was prepared by dissolving 25 grams of poly-(2,6-diphenyl-1,4-phenylene)-oxide in 225 grams of monochlorobenzene. Solution B was prepared by dissolving 2 grams of p-toluenesulfonic acid in 28 grams of tetrahydrofuran. Solution C was prepared by dissolving 15 grams of hexamethoxymethylmelamine in 15 grams of chlorobenzene. Thereafter, solutions were prepared as indicated in Table III below.

TABLE III

| Example No. | Quantity (grams) | | |
|---|---|---|---|
| | Solution A | Solution B | Solution C |
| 16 | 1.0 | 0 | 0 |
| 17 | 1.0 | 0 | 0.046 |
| 18 | 1.2 | 0 | 0.092 |
| 19 | 1.0 | 0.1 | 0.046 |
| 20 | 1.0 | 0.1 | 0.092 |
| 21 | 1.0 | 0.1 | 0 |

Each of the so formed solutions was poured into an aluminum pan and allowed to dry at room temperature overnight. Then the samples were heated at 260° F. for 15 minutes. A portion of the sample was then removed and tested for solubility in chloroform. The remainder of the sample was heated at 500° F. for 15 minutes and tested for solubility in the same manner. The results are shown in Table IV.

TABLE IV

| Example No. | Solubility in Chloroform after heat treatment | |
|---|---|---|
| | 260° F. | 500° F. |
| 16 | Soluble | Soluble. |
| 17 | do | Do. |
| 18 | do | Do. |
| 19 | do | Insoluble. |
| 20 | do | Do. |
| 21 | do | Soluble. |

The only samples found to be insoluble were those containing both crosslinking agent and catalyst and cured at 500° F. This illustrates the effect of cross-linking on the solubility of the polyphenylene oxides.

The heat curable resins of the present invention have many uses. However, they are particularly well suited for use as coating compositions. It has been found that a solution containing the polymer, cross-linking agent and Lewis acid coated on a metal surface and thereafter cured, has excellent adhesion to many surfaces. In addition, when used with the proper solvents, the resin solutions have a high speed of drying, the resultant polymer coatings are relatively stable upon aging, are highly impervious to moisture, and in fact, show a higher degree of water resistance than the top quality varnishes and lacquers. Also, the resins have the properties of the polyphenylene oxides, and thus, are highly durable. The high thermal resistance of the polyphenylene oxides render them suitable for many applications that would not be possible with other similar polymeric materials. In addition, the high electrical resistance of the polyphenylene oxides are desirable for many commercial applications.

It should, of course, be apparent to those skilled in the art, that changes may be made in the particular embodiments of the invention described which are within the full intent and scope of the invention as defined by the appended claims.

What I claim as new and desire to secure by Letters Patent of the United States is:

1. A heat curable composition consisting of a polyphenylene oxide of the formula

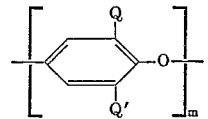

wherein Q and Q' are monovalent substituents selected from the group consisting of hydrogen, halogen, hydrocarbon radicals, halohydrocarbon radicals having at least two carbon atoms between the halogen atom and phenol nucleus, hydrocarbonoxy radicals having at least two carbon atoms and halohydrocarbonoxy radicals having at least two carbon atoms between the halogen atom and phenol nucleus; a crosslinking agent selected from the group consisting of polyfunctional halides, alcohols, ethers and esters which are capable of generating at least two carbonium ions in the presence of a Lewis acid catalyst; and a Lewis acid.

2. The heat curable composition of claim 1 wherein Q and Q' are methyl.

3. The heat curable composition of claim 1 wherein Q and Q' are phenyl.

4. The heat curable composition of claim 1 wherein the crosslinking agent has the following general formula:

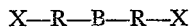

wherein B is a divalent radical selected from the group consisting of aryl, pseudo-aromatic heterocyclic, and ureido; R is a lower alkyl and X is an ionizable group selected from the group consisting of halogen, hydroxy, alkoxy and acyloxy attached to an α carbon atom.

5. The heat curable composition of claim 1 wherein the crosslinking agent is a diacetoxymethyldiphenyloxide.

6. The heat curable composition of claim 1 wherein the crosslinking agent is a paraformaldehyde-m-xylene condensate.

7. The heat curable composition of claim 1 wherein the crosslinking agent is 1,4-dihydroxymethylbenzene.

8. A coating composition consisting of:
(1) a polyphenylene ether having the formula

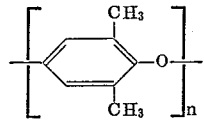

wherein $n$ is a whole integer of at least 10;
(2) a crosslinking agent having the formula

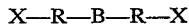

wherein B is a divalent radical selected from the group consisting of aryl, pseudo-aromatic heterocyclic and ureido; R is a lower alkyl and X is an ionizable group selected from the group consisting of halogen, hydroxy, alkoxy and acyloxy attached to an α carbon atom;
(3) a Lewis acid catalyst; and
(4) a solvent for the polyphenylene oxide, crosslinking agent and catalyst.

9. The coating composition of claim 8 wherein the crosslinking agent is diacetoxymethyldiphenyloxide.

10. The coating composition of claim 8 wherein the crosslinking agent is a paraformaldehyde-m-xylene condensate.

No references cited.

WILLIAM H. SHORT, *Primary Examiner.*

M. GOLDSTEIN, *Assistant Examiner.*